United States Patent [19]

Busch et al.

[11] Patent Number: 5,061,914

[45] Date of Patent: Oct. 29, 1991

[54] SHAPE-MEMORY ALLOY MICRO-ACTUATOR

[75] Inventors: John D. Busch; Alfred D. Johnson, both of Berkeley, Calif.

[73] Assignee: Tini Alloy Company, Berkeley, Calif.

[21] Appl. No.: 373,030

[22] Filed: Jun. 27, 1989

[51] Int. Cl.$^5$ .................... H01H 61/06; H01H 71/18
[52] U.S. Cl. ........................................ 337/140; 60/527
[58] Field of Search .................. 337/140; 60/527, 528; 427/295

[56] References Cited

U.S. PATENT DOCUMENTS 4,864,824  9/1989  Gabriel et al. ........................ 60/527

Primary Examiner—H. Broome
Attorney, Agent, or Firm—McCubbrey, Bartels, Meyer & Ward

[57] ABSTRACT

A method of producing an integral piece of thermo-sensitive material, which is responsive to a shift in temperature from below to above a phase transformation temperature range to alter the material's condition to a shape-memory condition and move from one position to another. The method is characterized by depositing a thin film of shape-memory material, such as Nickel titanium (Ni-Ti) onto a substrate by vacuum deposition process such that the alloy exhibits an amorphous non-crystalline structure. The coated substrate is then annealed in a vacuum or in the presence of an inert atmosphere at a selected temperature, time and cool down rate to produce an ordered, partially disordered or fully disordered BCC structure such that the alloy undergoes thermoelastic, martinsetic phase transformation in response to alteration in temperature to pass from a martinsetic phase when at a temperature below a phase transformation range and capable of a high level of recoverable strain to a parent austenitic phase in a memory shape when at a temperature above the phase transformation range.

Also disclosed are actuator devices employing "shape-memory material" actuators that deform from a set shape toward an original shape when subjected to a critical temperature level after having been initially deformed from the original shape into the set shape while at a lower temperature. The actuators are mechanically coupled to one or more movable elements such that the temperature-induce deformation of the actuators exerts a force or generates a motion of the mechanical element(s).

9 Claims, 12 Drawing Sheets

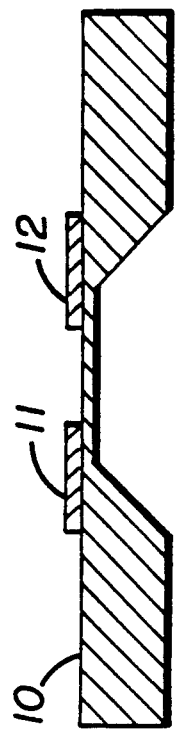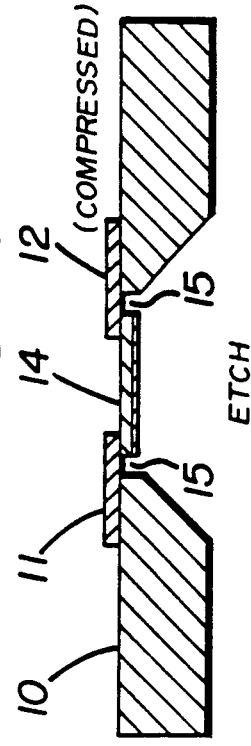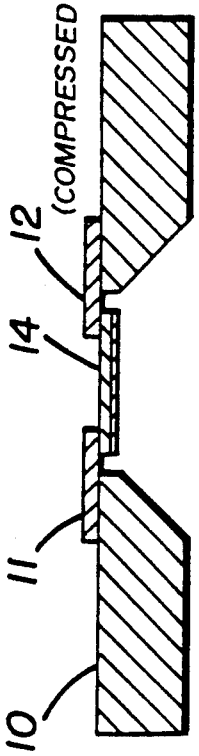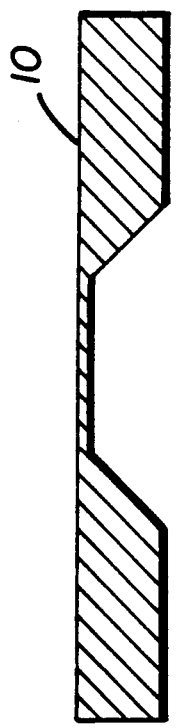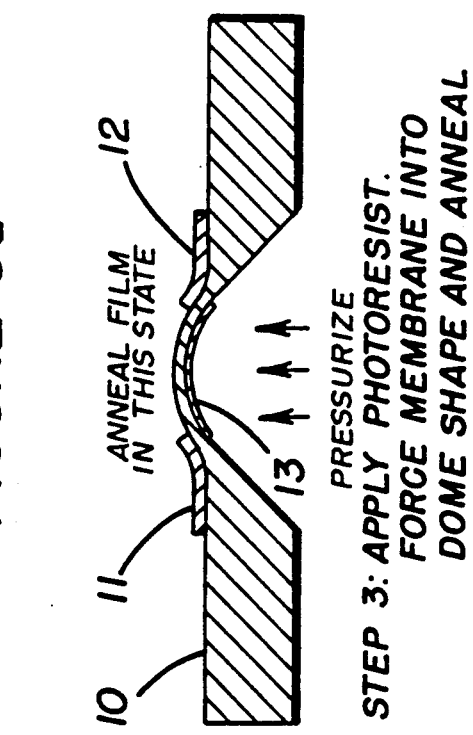

⊢—⊣ 1 MICRON
FIG.\_11a
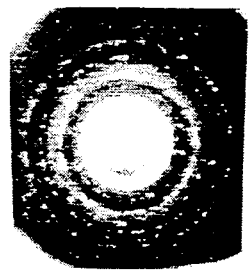
FIG.\_11b
⊢—⊣ 1 MICRON
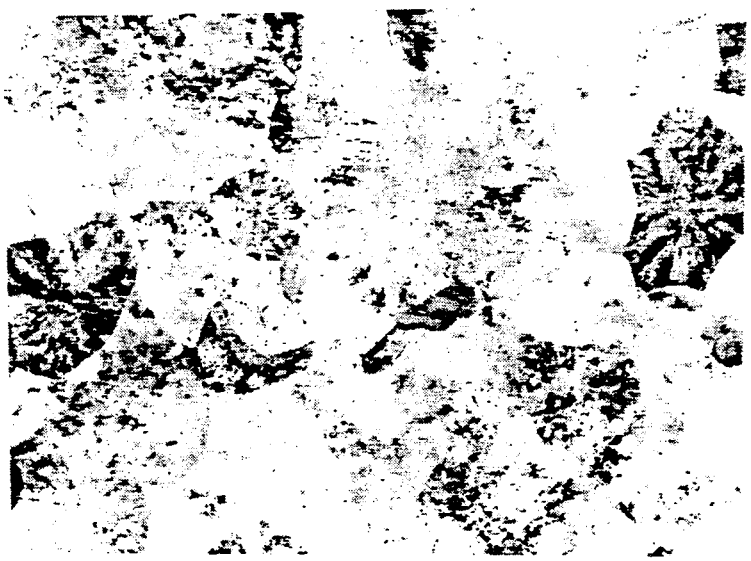
FIG.\_12a
FIG.\_12b

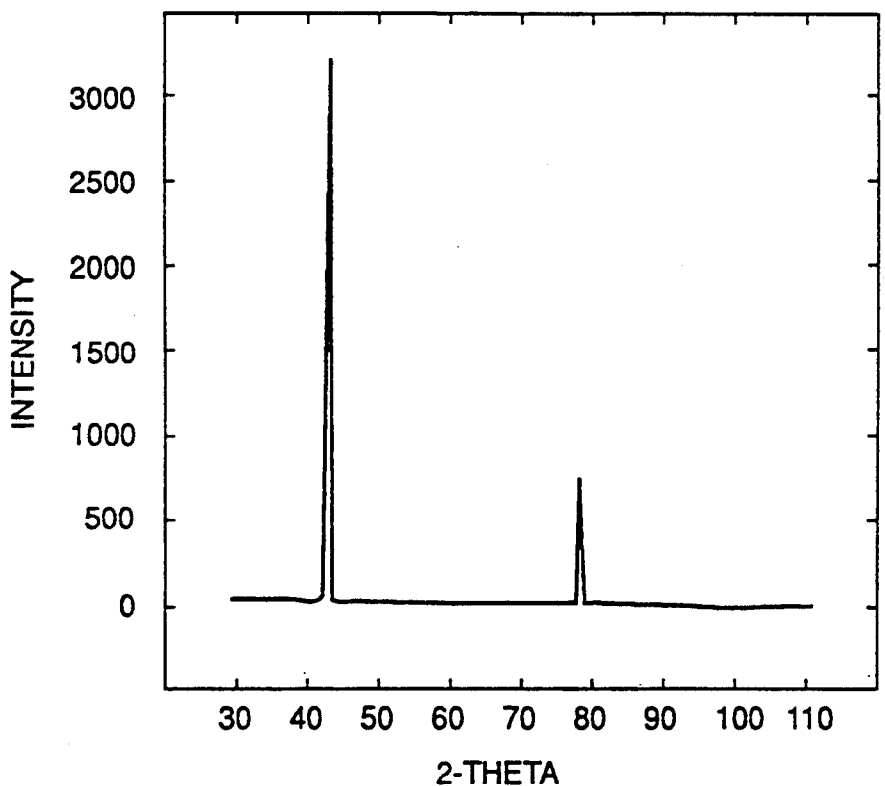
FIG._4
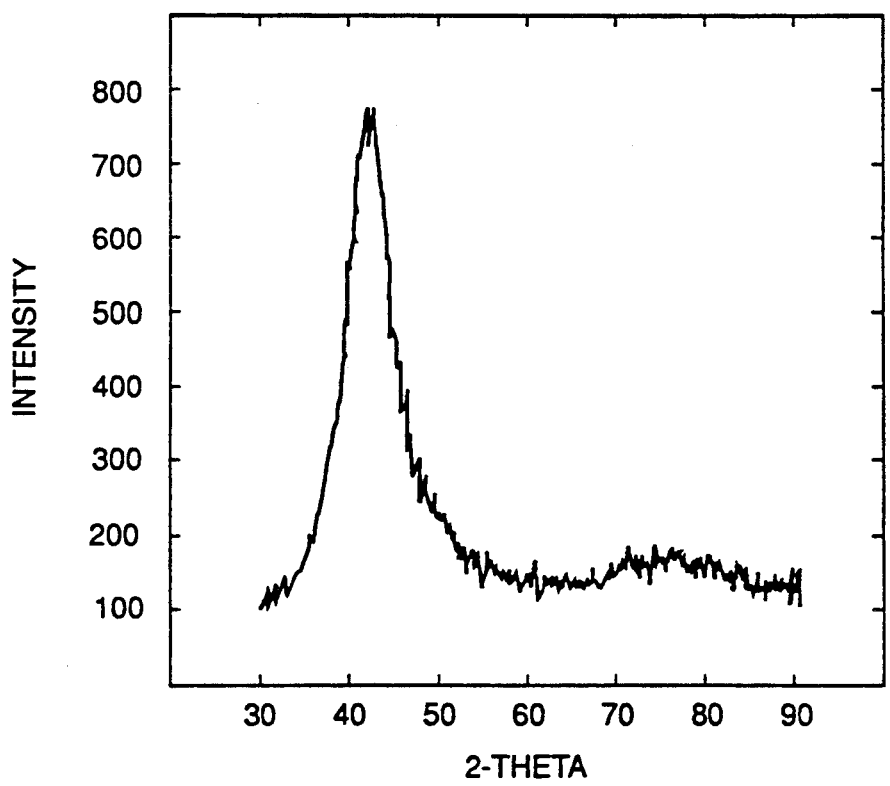
FIG._5

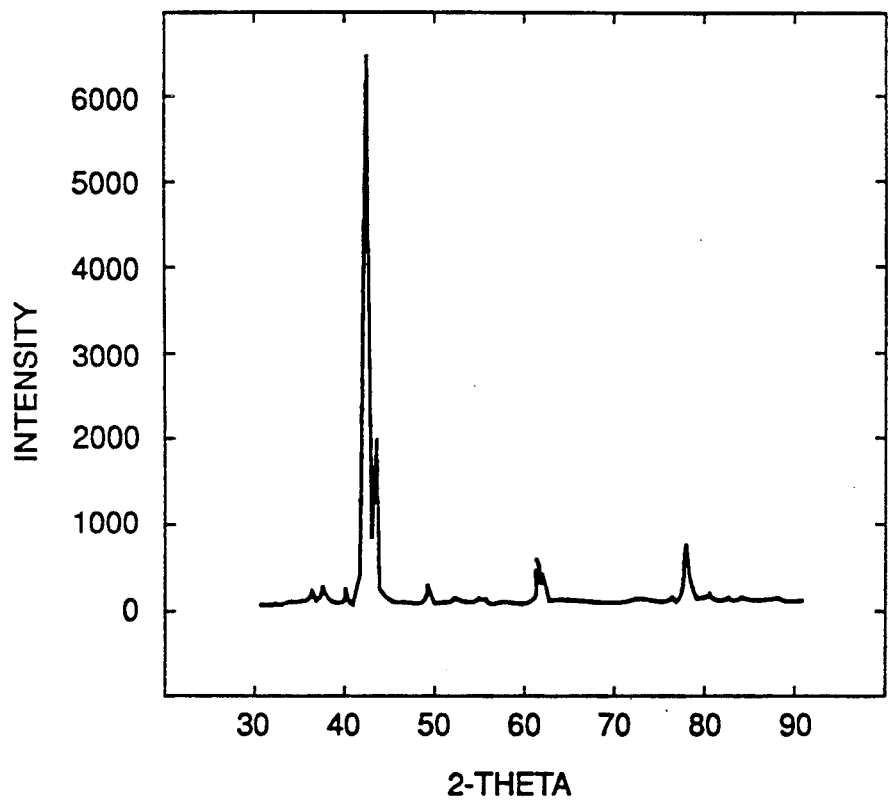
FIG._6
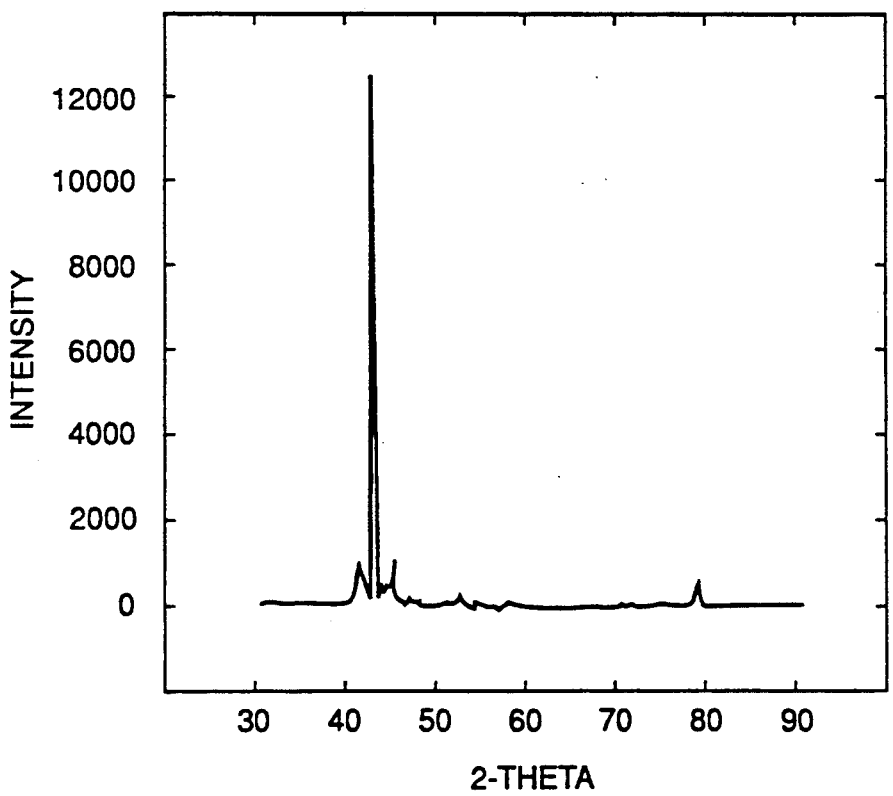
FIG._7

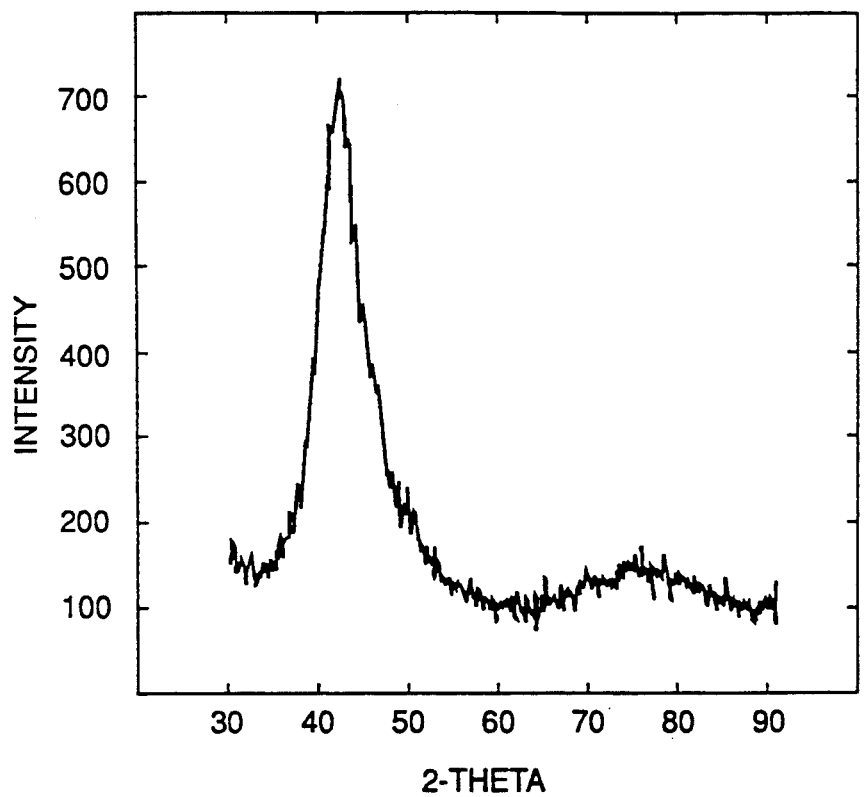
FIG._8
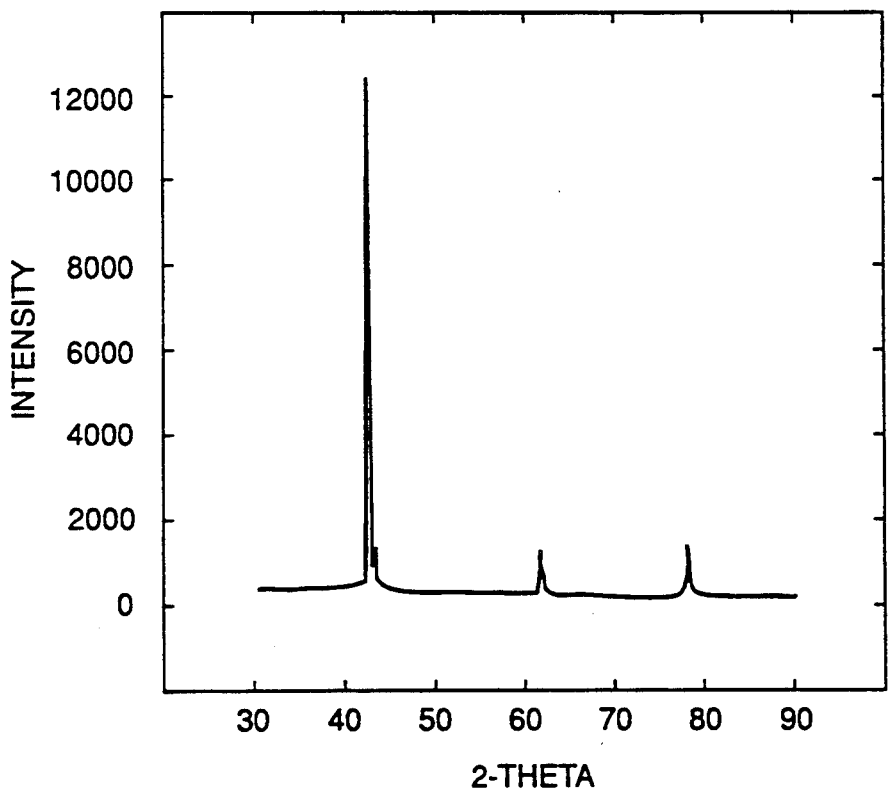
FIG._9

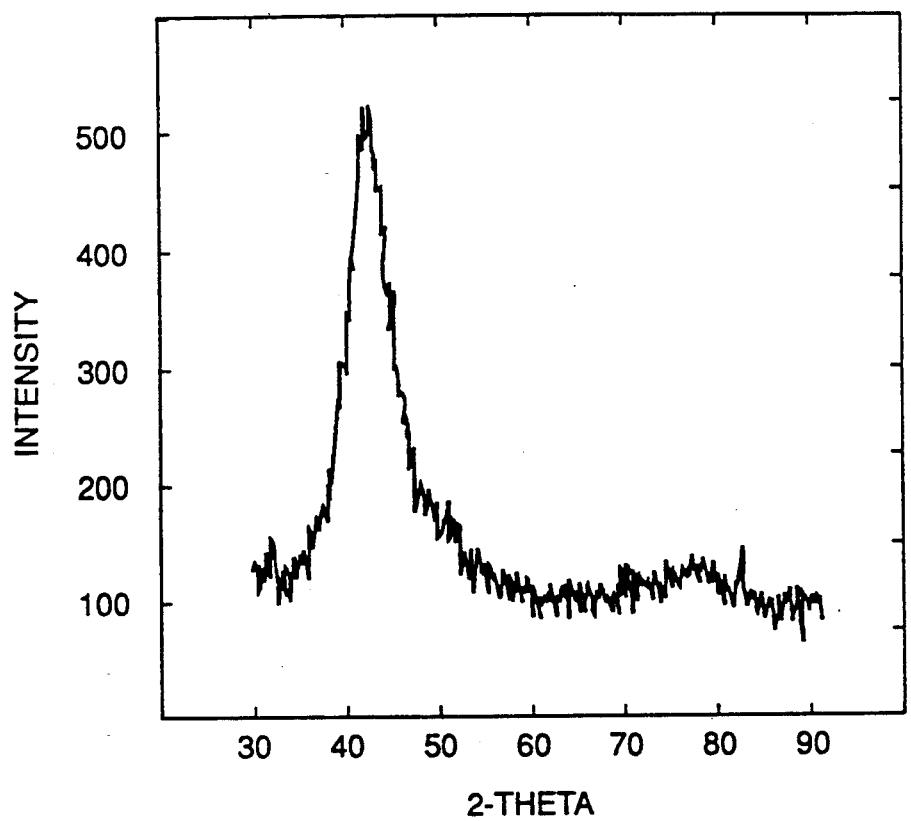
FIG._10

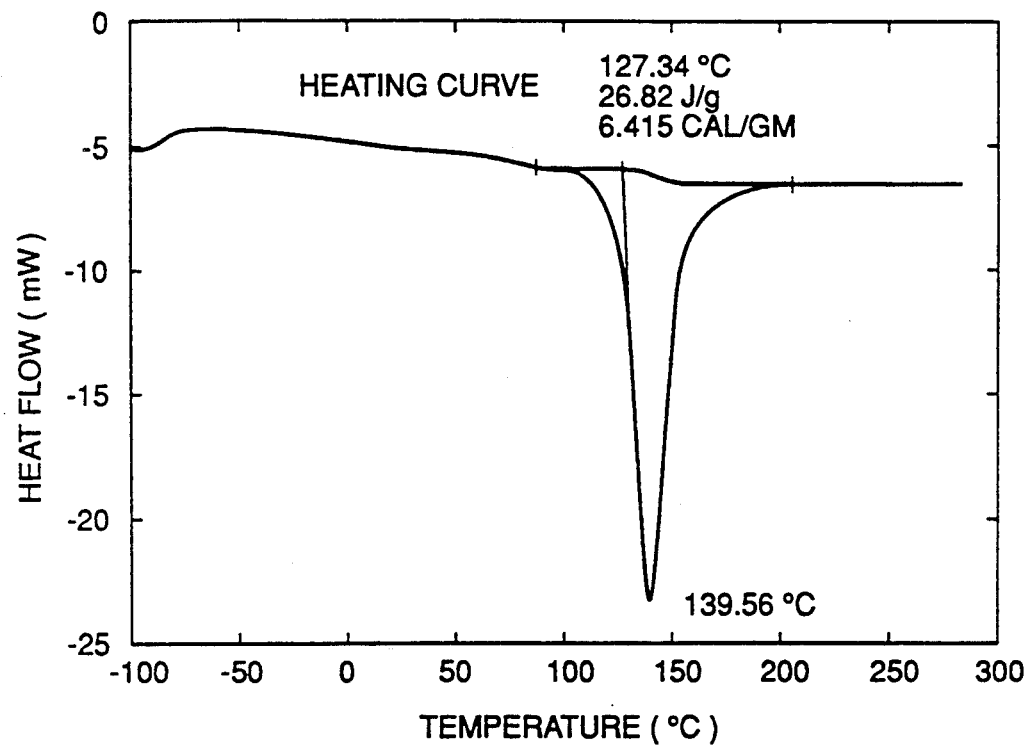
FIG._13a
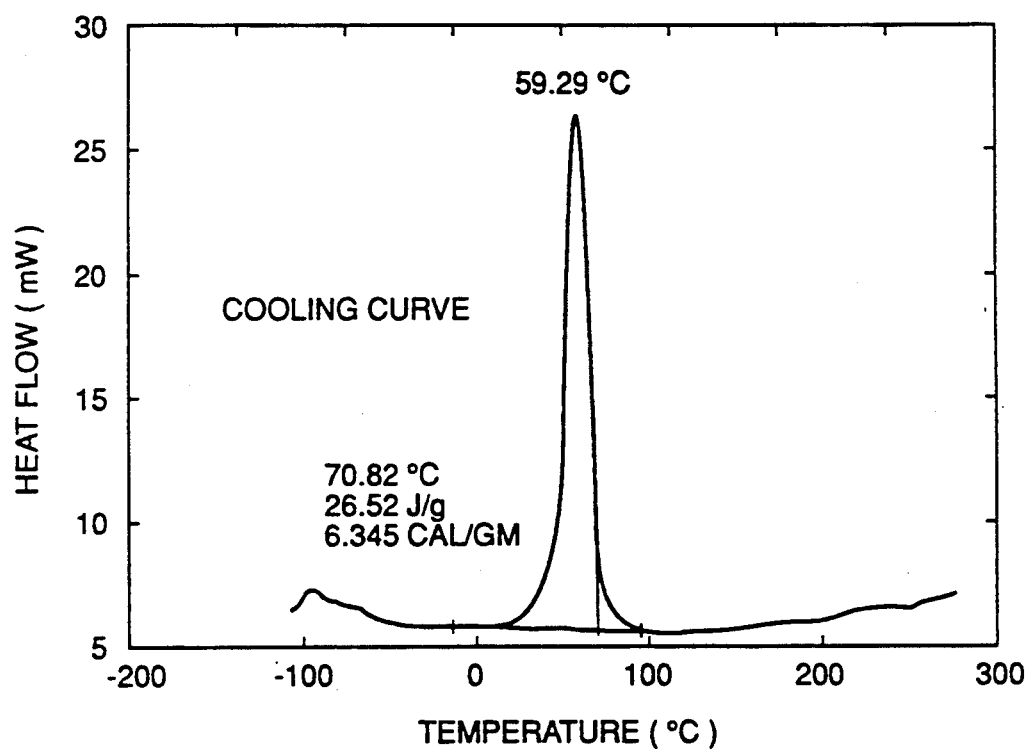
FIG._13b

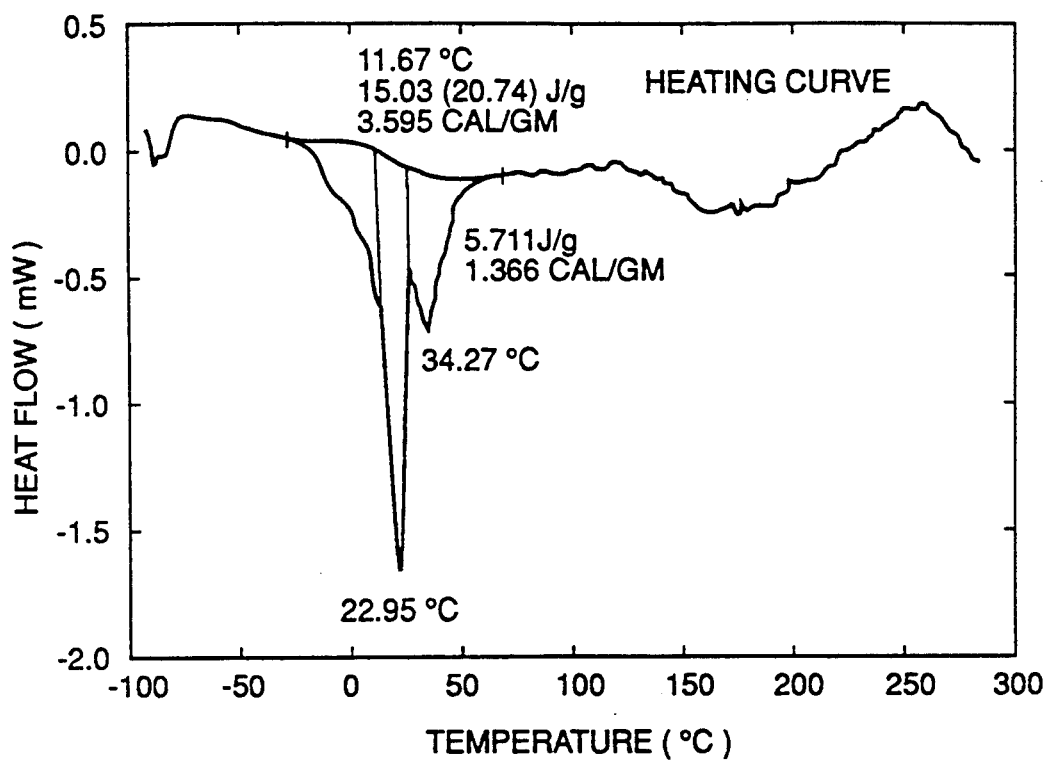
FIG._14a
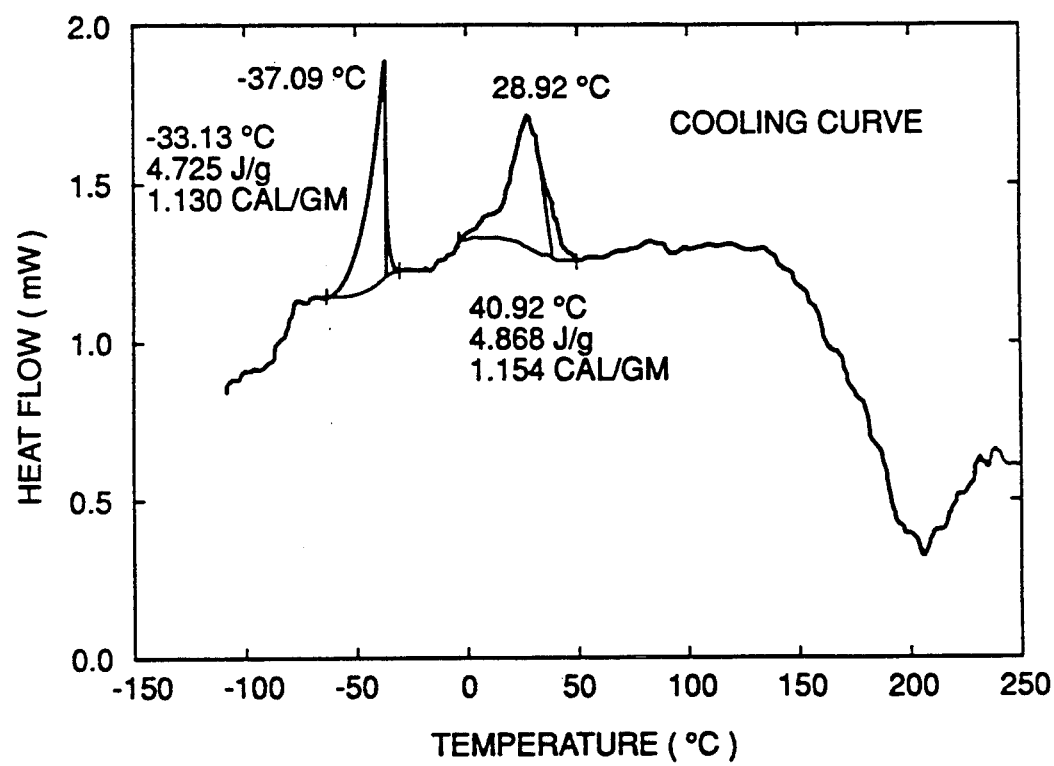
FIG._14b

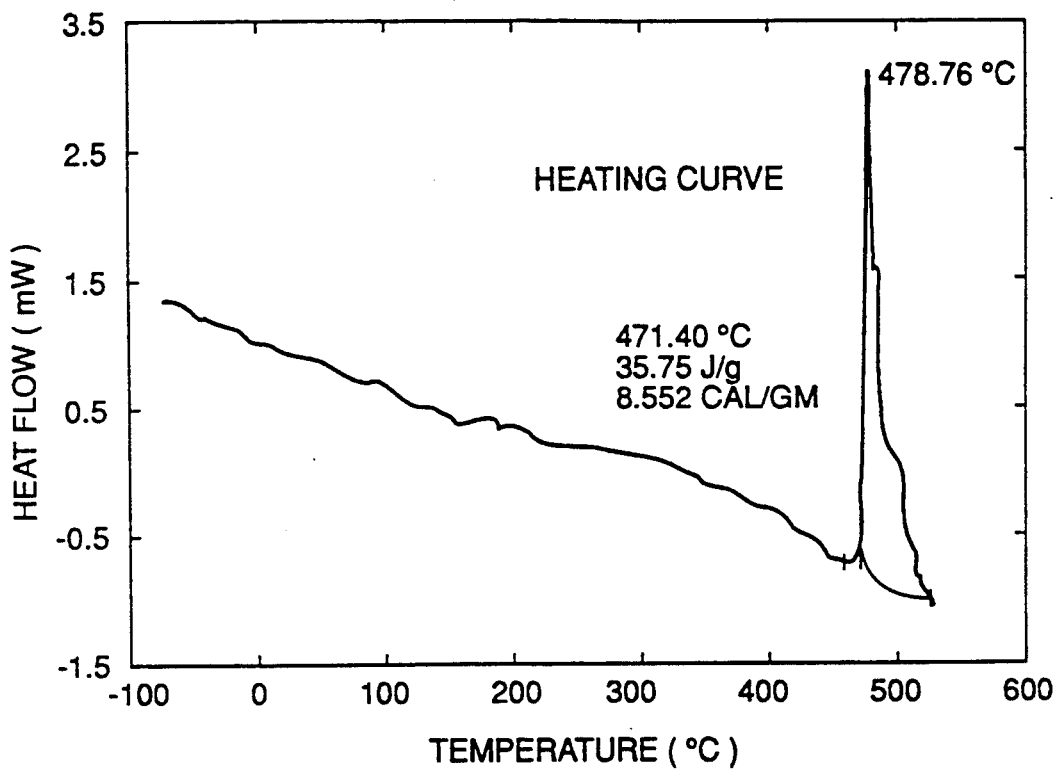
FIG._15a
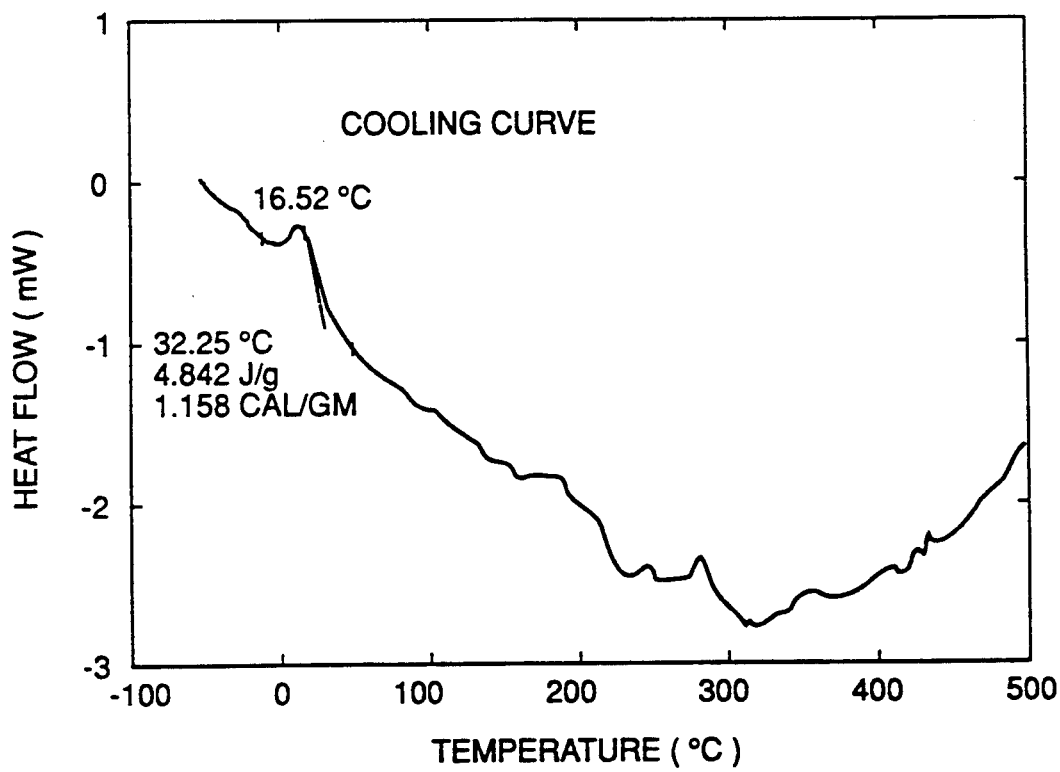
FIG._15b

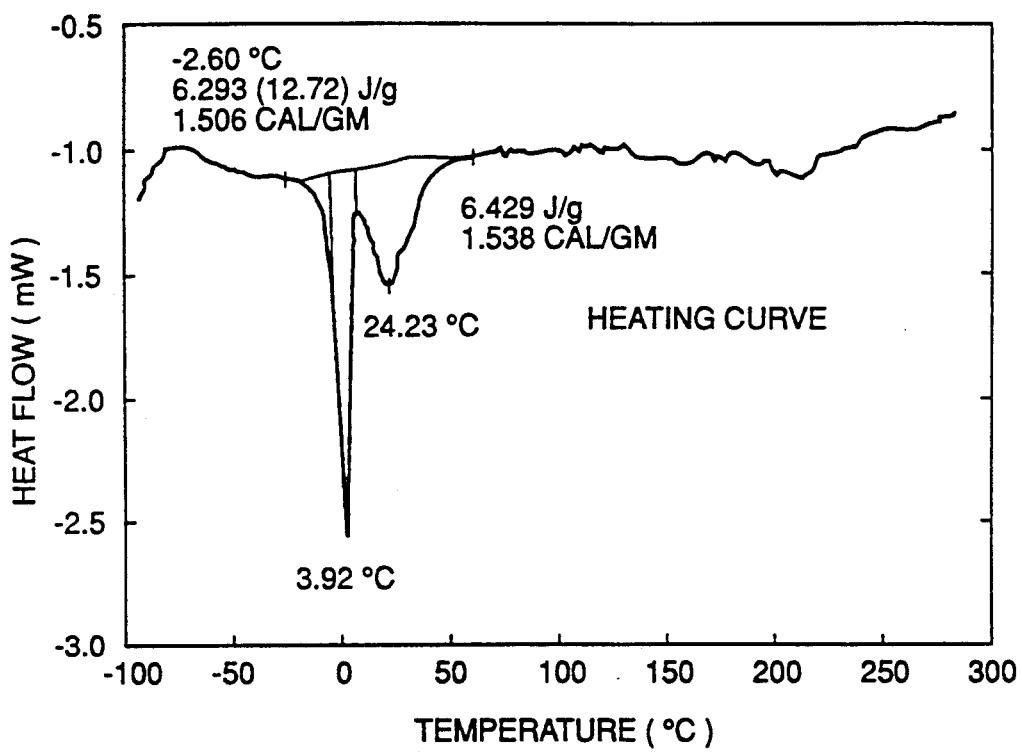
FIG._16a
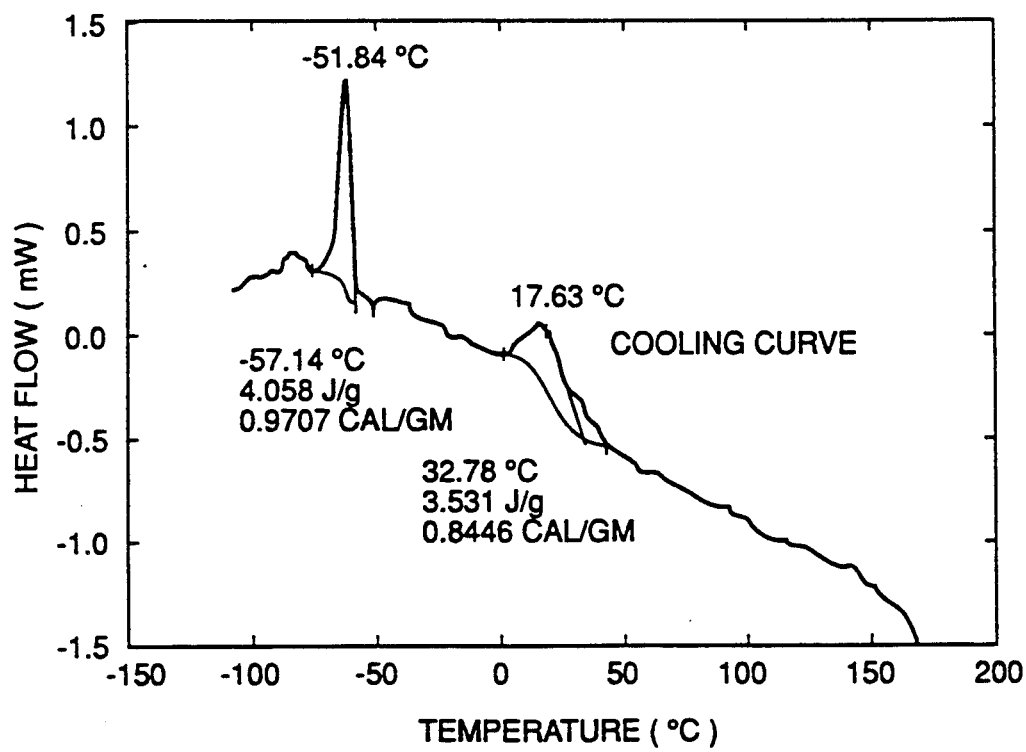
FIG._16b

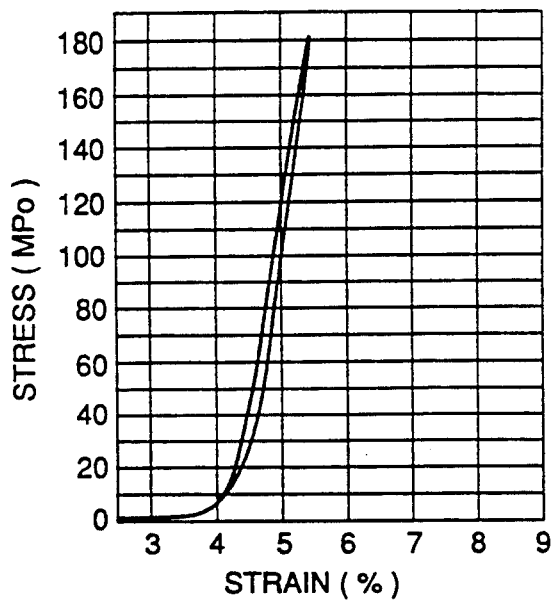
FIG._17
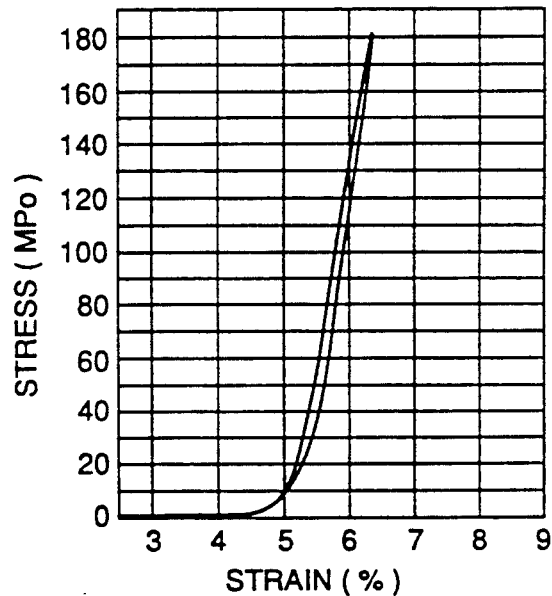
FIG._19
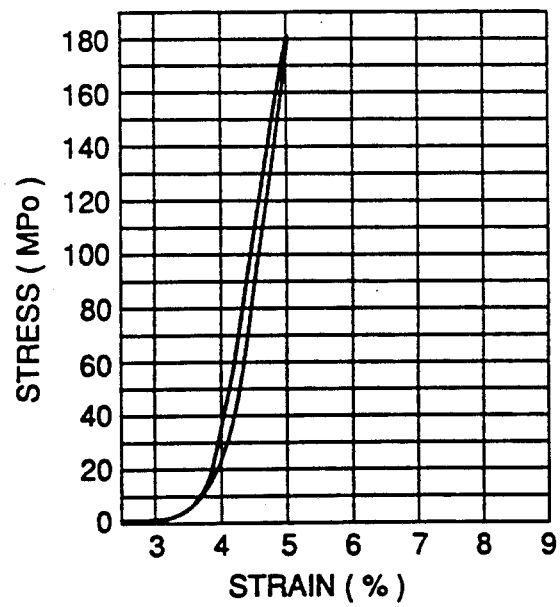
FIG._18
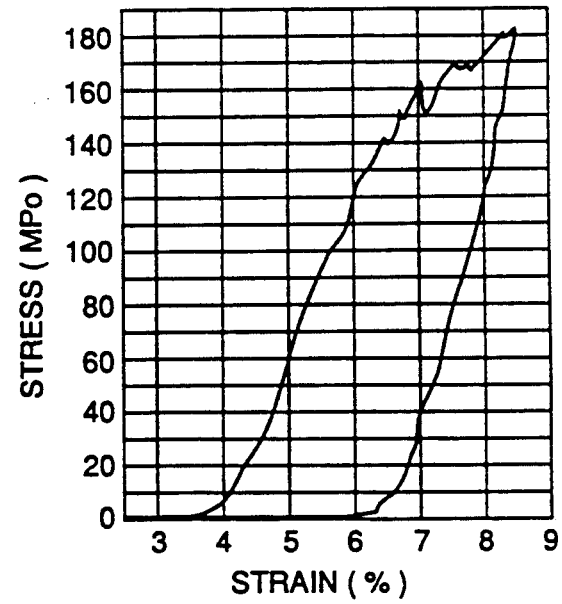
FIG._20

SHAPE-MEMORY ALLOY MICRO-ACTUATOR

This invention was made with government's support under contract NAS2.12797 awarded by NASA. The government has certain rights in this invention.

FIELD OF THE INVENTION

This invention relates generally to actuator devices. More particularly, the invention relates to an actuator device for obtaining quantitative motion of a micro-mechanical element by utilizing a shape-memory alloy actuating element, and a method of producing thin films of shape-memory material.

BACKGROUND OF THE INVENTION

It is known that certain metals, commonly referred to as "shape-memory alloys", undergo a temperature related phase change which is characterized by the memory of any mechanical configuration imposed on the material at the annealing temperature $T_a$. When the material is below some lower temperature $T_o$, it possesses a particular crystal structure whereby the material may be deformed into an arbitrary shape with relative ease. Upon heating the shape-memory alloy above a higher temperature $T_e$, it undergoes a change in crystal structure and the memory effect is manifested by a resumption of the originally imparted shape, representing the onset of a restoring stress, where $T_o < T_e < T_a$. The transition temperature range of a shape-memory alloy, over which the phase transformation occurs, is defined as being between $T_o$ and $T_e$. These memory materials have been produced in bulk form primarily in the shape of wires, rods, and plates.

The best known and most readily available memory alloy is Nitinol, an alloy of nickel and titanium. With a temperature change of as little as 18° F., Nitinol can exert a force of as much as 60,000 psi when exerted against a resistance to changing its shape.

Actuators have heretofore been developed which employ shape-memory alloys or materials. These actuators generally operate on the principal of deforming the shape-memory alloy while it is below its phase transformation temperature range and then heating it to above its transformation temperature range to recover all or part of the deformation, and in the process create motion of one or more mechanical elements. The actuators employ one or more shape-memory effect elements produced in bulk form and are therefore limited in size and usefulness. U.S. Pat. Nos. 4,055,955 3,725,835, 4,553,393 and 3,849,756 disclose such actuators employing bulk form shape-memory elements Micro-actuators a few micro meters in size are presently needed for opening and closing valves, moving switches and generally providing motion for micro-mechanical devices. The means by which motion may be created in such small dimensions are very limited and subject to problems. For example, actuator have often employed means utilizing electrostatic forces. However, electric fields exert a force which is proportional to the area of the conductor. Thus, as the dimensions of the actuator decrease the electrostatic forces also decrease.

The disclosed invention employs the unique properties of shape-memory alloys to micro-actuators by means of thin film technology. The use of shape-memory alloys in micro-actuators will increase the performance of actuators for micro-mechanical devices by several orders of magnitude. This is accomplished by the fact that both stress and strain of the shape memory effect can be very large, providing substantial work output per unit volume. For example, the work output of the nickel-titanium shaped memory alloy is of the order of 1 joule per gram per cycle. Correspondingly, a shape memory film micro-actuator 1mm on each side and 10 microns thick (volume equals $10^{-6}$ $cm_3$ weights approximately 64 micro-grams and can be expected to produce 64 microjoules of work per cycle. By contrast, an electrostatic actuator of the same volume might generate $10^{-3}$ microjoule and a similar piezo-electric device is limited to about 0.1 microjoule per cycle, depending on voltage.

Micro-mechanical actuators of shape-memory film will also provide the following advantages: (1) exert stresses of hundreds of mega-pascals; (2) tolerate strains of more than 3%; (3) work at common TTL voltages, these being much lower than electrostatic or piezo requirements; (4) be directly powered with electrical leads on a chip; and (5) survive millions of cycles without fatigue.

As previously discussed, the disclosed invention employs thin films of shape-memory alloy to produce actuators of micron size. The disclosed method for depositing these shape-memory films results in a material crystallography which is mostly a disordered structure with a small amount of included ordered precipitates; this being evident when the material is in its high temperature phase. However, the general expectation of shape-memory alloys in the field of crystallography is that an ordered structure is required to manifest the shape-memory effect. The disclosed invention teaches that this is not the case and that the shape-memory effect which results from a partially disordered crystal structure may in fact be better than the effect in conventional material.

Further, it is not readily apparent that a thin film of a material which exhibits shape-memory characteristics in bulk form will exhibit shape-memory characteristics in bending. A thin film is, because of its high aspect ratio, basically a two dimensional body. Any shape-memory characteristics exhibited in bending would, accordingly, be expected to be significantly attenuated if present at all. The disclosed invention teaches that not only does thin film shape-memory alloy exhibit a strong shape-memory recovery in bending, but it does so with less than 0.5% strain which is not at all characteristic of conventional bulk shape-memory alloy. The conventional shape-memory alloy must typically be strained in excess of 1%.

A Japanese group comprising Minemura, et al. at the Hitachi Research Laboratory in Japan has reported shape-memory effect in sputter deposited films of cooper-aluminum-nickel (Journal of Material Science Letters 4 (1985) 793-796). The shape-memory allegedly achieved, however, was in connection with composite materials of cooper-aluminum-nickel films on aluminum foil. The composite material was bent in liquid nitrogen and returned to its original shape as the temperature rose. Since this property was not established in the film by itself, it is suspected that the observed phenomenon was a result of differential thermal expansion stemming from two dissimilar materials in intimate contact. Moreover, a gradual return to the original shape as observed by the authors does not suggest the typical shape-memory transition, which tends to occur suddenly at the transition temperature.

A general object of the invention is to provide an improved actuator device suitable for micro-mechanical applications.

It is another object of the present invention to provide a shape-memory alloy micro-actuator device employing an actuating element that is less than 10 microns thick, and capable of creating motion of mechanical elements a few micro-meters in size.

Another object is to provide a method for producing a thin film of shape-memory alloy to provide such a force on or motion of a micro-mechanical element.

Another object is to provide a two-state micro-actuator employing a pair of micro-actuating elements comprising thin films of shape-memory alloy, and a method for producing same.

SUMMARY OF THE INVENTION

The disclosed shape-memory alloy actuators substantially reduce or eliminate the disadvantages and short comings associated with the prior art techniques. Thin films of shape-memory materials are employed in the actuators to create motion of mechanical elements as small as a few micro-meters in size. The shape-memory alloy actuating elements are responsive to a shift in temperature from below to above a phase transformation temperature range to alter the alloy's condition to a shape-memory condition and move from one position to another.

Generally, a shape-memory actuating element according to the invention is fabricated on a substrate by a vacuum deposition process, such as sputtering. The shape-memory alloy element is then annealed in a "memory" shape, and subsequently stressed by deformation so that after fabrication is complete the shape-memory element is plastically deformed. As a result, when the shape-memory alloy element is heated it reverts to its original "memory" shape, thereby exerting a force or generating a motion of a mechanical element.

According to the method a thin film of shape-memory material, such as Nickel Titanium (Ni-Ti), is deposited onto a substrate by a vacuum deposition process such that the alloy exhibits an amorphous non-crystalline structure. The coated substrate is then annealed in a vacuum or in the presence of an inert atmosphere at a selected temperature, time and cool down rate to produce an ordered, partially disordered or fully disordered BCC structure such that the alloy undergoes thermoelastic, martensitic phase transformation in response to alterations in temperature to pass from a martensitic phase when at a temperature below a phase transformation temperature range and capable of a high level of recoverable strain to a parent austenitic phase in a memory shape when at a temperature above the phase transformation range. A disordered BCC structure is a body-centered cubic crystal structure exhibiting a random and/or irregular arrangement of the structure throughout the alloy. An alternative method for producing the aforementioned properties is to deposit the shape-memory alloy on a preheated substrate, causing crystal growth in situ during depsition and thereby eliminating the need to separately anneal the film.

BRIEF DESCRIPTION OF THE DRAWINGS

Further features and advantages will become apparent from the following and more particular description of the preferred embodiments of the invention, as illustrated in the accompanying drawings, and which like reference characters generally refer to the same parts or elements throughout the views, and in which:

FIGS. 3a, 3b, 3c, 3d, and 3e graphically illustrate a method for producing a two-state micro-actuator data storage medium in accordance with the invention.

FIGS. 4 through 10 are graphs illustrating X-Ray Diffraction results of Ni-Ti shape memory films under various conditions.

FIGS. 11a, 11b, 12a and 12b are Transmission Electron Microscope micrographs of Ni-Ti shape memory films.

FIGS. 13 through 16 are Differential Scanning Calorimeter thermograms of Ni-Ti shape memory films under various conditions.

FIGS. 17 through 20 are stress/strain curves of Ni-Ti shape memory films under various conditions.

DETAILED DESCRIPTION OF THE INVENTION

In accordance with the present invention, the disclosed shape-memory alloy micro-actuator device eliminates the disadvantages and shortcomings associated with the prior art techniques. According to the invention, a support element, a movable element and a shape-memory alloy micro-actuating element are provided to create motion of mechanical elements a few micrometers in size. The key feature of the invention is the thin film shape-memory micro-actuating elements which are less than 10 microns in thickness.

Figure 1A:
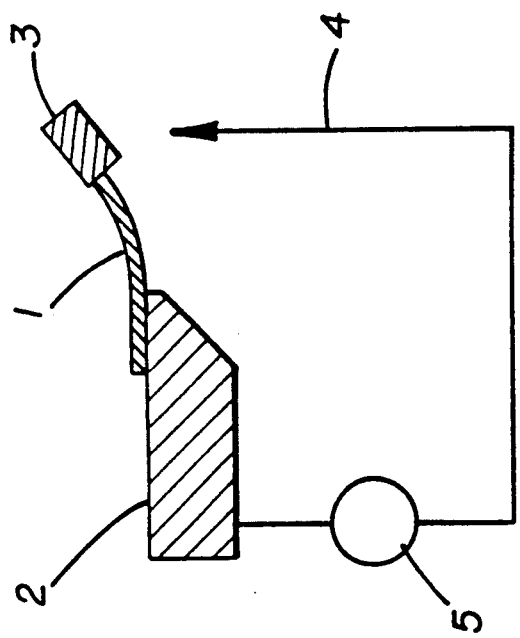
FIGS. 1a and 1b illustrate in simplified form a micro-actuator embodiment of the invention incorporating a thin film shape-memory micro-actuating element produced in accordance with the invention.

FIG. 1a illustrates in simplified form a micro-actuator according to the present invention. The primary elements of the micro-actuator comprise a support 2, a movable element 3 and a temperature-sensitive micro-actuating element 1.

The temperature-sensitive micro-actuating element 1 links the support 2 to the movable element 3. The actuating element 1 and movable element 3 are displaceable between a first position as illustrated in FIG. 1a and a second position as illustrated in FIG. 1b.

The temperature-sensitive micro-actuating element 1 comprises a thin film of shape-memory alloy having a phase transformation temperature range below which the alloy is in a ductile condition (capable of a first high level of strain i.e. <6%) and above which the alloy is in a shape-memory condition (having recovered the induced strain). The actuating element 1 is initially positioned in the first position as illustrated in FIG. 1a when the alloy is in the ductile condition. When the actuating element 1 is heated from below to above its phase transformation temperature range it alters its condition to the shape-memory condition and thus moves from the first (FIG. 1a) to the second position (FIG. 1b).

Figure 1B:
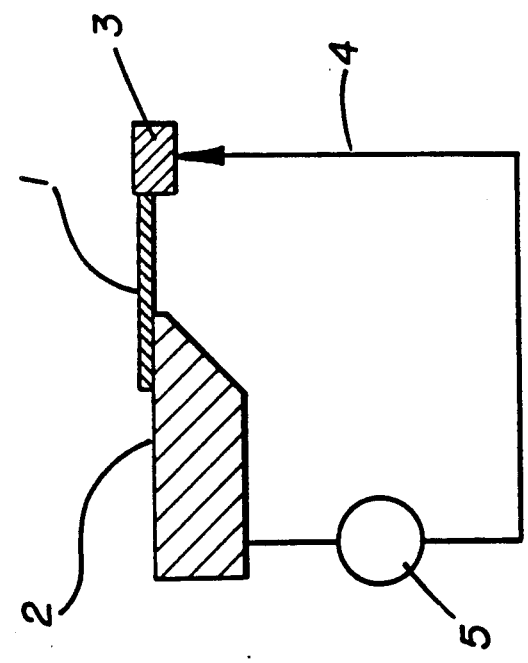

A specific embodiment of the invention is illustrated in FIGS. 1a and 1b where the micro-actuating element is employed as a micro-electrical circuit breaker. A controlled member 3 supported at the junction of the micro-actuating element 1 and reset portion can be linearly reciprocated from a closed position (FIG. 1a) to an open position (FIG. 2a) by a selected heating cycle. An electrical circuit 4 could thus be controlled and the circuit condition indicated by means of an external read-out device 5. Under some circumstances, it may be useful to incorporate the movable element 3 as part of and integral with the actuating element 1.

Figure 2A:
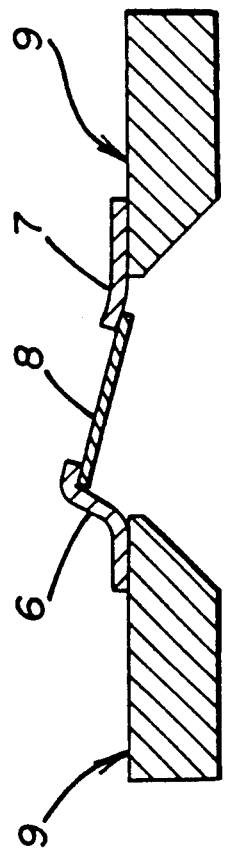
FIGS. 2a and 2b illustrate in simplified form a two-state micro-actuator embodiment of the invention incorporating a pair of thin film shape-memory micro-actuating elements produced in accordance with the invention.
Figure 2B:
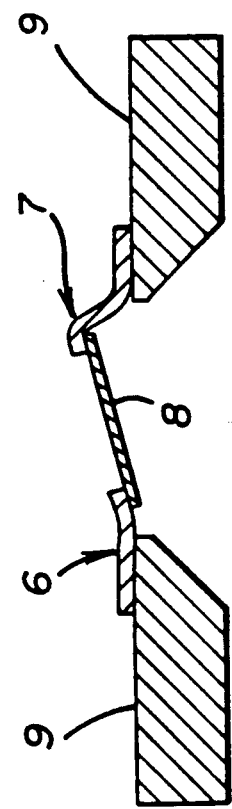

An alternative embodiment of the present invention is the two-state micro-actuator illustrated in FIGS. 2a and 2b. This embodiment comprises a support 9, a movable element 8, and a pair of temperature-sensitive micro-actuating elements 6, 7. The actuating elements 6, 7 link the support 9 to the movable element 8. Since FIGS. 2a and 2b are intended to be schematized cross-sections, the actuator elements 6 and 7 are shown of exaggerated thickness for clarity. It is to be understood that these elements are thin film elements and are attached to opposite edges of the movable element 8. The support 9 may be a silicon wafer, disk or other suitable structure, depending upon the particular application of the bistable device. The opposite ends of the actuator elements 6 and 7 from the movable element 8 are fixedly attached to the upper surface of a support 9. The movable element 8 may be, for example, silicon. The actuating elements 6, 7 and the movable element 8 are displaceable between a first position, as illustrated in FIG. 2a and a second position, as illustrated in FIG. 2b.

Each micro-actuating element 6, 7 is comprised of a thin film of shape-memory alloy having a phase transformation temperature range above which the alloy is in a ductile condition and below which the alloy is a shape-memory condition. The actuating elements are fabricated by depositing a shape-memory alloy on the support 9 and annealing in a memory shape. The actuating elements 6, 7 are then stressed by deformation so that after fabrication is complete the actuating elements 6, 7 are plastically deformed. As a result, as illustrated in FIG. 2a, when one of the actuating elements is heated it reverts to its original shape, moving the movable element 8 of the device and further deforming the opposing actuating element. After heating, both actuating elements 6, 7 cool to a martensitic state and the actuator device remains in the moved position.

As illustrated in FIG. 2b, heating the opposite actuating element causes the actuator device to be moved to its other stable position. The two stable positions could thus correspond to opening and closing a valve or switch, or to tilting a mirror which is read by laser to determine its position. For example, the number "one" could be written to a mirror element by a laser pulse to one micro-actuating element 6, and a zero by a pulse to the opposite actuating element 7. Read-out is accomplished by a laser pulse of lesser intensity directed at the center of the mirror. The angle of reflection tells which way the mirror is tilted, in the "one" condition (FIG. 2a) or in the "zero" state (FIG. 2b).

By way of further example, methodology is now disclosed for producing the aforementioned two-state micro-actuator. As illustrated in FIG. 3a, thin windows are created in a substrate 10 by etching away the reverse side to a few microns of thickness, leaving a membrane covering each window.

A thin film of shape-memory alloy is then deposited onto the substrate by means of a vacuum deposition process such that the alloy exhibits an amorphous crystalline structure. The shape-memory alloy is deposited onto the substrate in a pattern which covers two opposite edges of each dome with a stripe 11, 12 (FIG. 3b).

The substrate edge is sealed, and a force is applied through a medium such as inert gas pressure to the underside of the substrate (FIG. 3c). Each window of the substrate is thus deformed upward into a dome, and the shape-memory alloy films 11, 12 on its upper surface are plastically deformed.

In this configuration, the alloy films 11, 12 are annealed in a vacuum or in the presence of an inert atmosphere at a selected temperature (400°C.-520° C.), time (15-30 min.) and cool down rate (air cool) to produce an ordered, partially disordered or fully disordered BCC structure when heated above its phase transformation temperature and exhibiting characteristics of mechanical shape-memory. Internal stresses are also relieved, and the thin films 11, 12 are given a memory shape which bridge from the substrate 10 to the dome formed by each window.

When the pressure is removed, the domes bridged by the alloy films 11, 12 collapse into a flat surface (FIG. 3d). In straightening, the substrate membrane compresses the alloy films and bends them downward. The relative thicknesses of the membrane and shape-memory alloy films 11, 12 are selected such that the actuating element is strained approximately 3%. In this way, a much larger deformation can be achieved in the alloy then in the substrate membrane.

A mask photoresist 13 is then employed to create a barrier to etching on the underside of each dome, covering most of the area under the bridge formed by the alloy films 11, 12 on the opposite side, but leaving the ends to be etched away (FIG. 3d). The periphery of each window 15 is then etched away leaving an island of the original substrate under each of the alloy films 11, 12.

What is left in each window is now an island of substrate membrane 14 connected to the main substrate 10 by two strips of alloy film 11, 12 (FIG. 3e). The other two sides are free to move. The remaining island of substrate 14 in the center of each window makes a flat surface which is rigid, while the alloy films 11, 12 at each end are bent where they attach the island 14 to the main body of the substrate 10.

The result is a stable two-state device. When the alloy film (actuating element) 11 at one side of the island is heated, it attempts to revert to the memory shape. In doing so, it deforms the alloy film (actuating element) 12 at the other side of the window into a tighter bend, and the mirror becomes tilted away from the segment which is heated. Opposite tilt is achieved by heating the opposite actuating element 12. After heating, the hysteresis inherent in the shape-memory alloy prevents the return to a neutral position. The alloy film is too long for the space, so it has to be kinked on end or the other. This yields a stable two-state device.

Methodology is now disclosed for producing the aforementioned thin film micro-actuating elements. The method is characterized by depositing a thin film of shape-memory alloy onto a substrate by means of a vacuum deposition process such that the alloy exhibits an amorphous structure. The alloy is then annealed in a vacuum or in the presence of an inert atmosphere at a selected temperature (480° C.-520° C.), time (15-30 min.) and cool down rate (air cool) to produce an ordered, partially disordered or fully disordered BCC crystalline structure such that the alloy undergoes thermoelastic, martensitic phase transformation in response to alterations in temperature to pass from a martensitic phase when at a temperature below the phase transformation range and capable of a high level of recoverable strain (<6%) to a parent austenitic phase and a memory shape when at a temperature above the phase transformation temperature. Alternatively, the shape-memory alloy could be deposited onto a pre-heated substrate resulting in the same properties.

The examples which follow are for illustrative purposes only and are not meant to limit the scope of the claims in any way.

EXAMPLES

I. FILM PRODUCTION

Preliminary films of titanium and nickel titanium (Ni-Ti) alloy were sputtered onto substrates of glass, copper and aluminum. Sputtering was chosen as to method of deposition for the following examples and prealloyed targets were used because it is recognized as the most reliable method to deposit a thin film with the same composition as that of the source material.

Ni-Ti targets of different composition were used. Target 1 (T1) was known to be approximately 50 atomic percent titanium with a transition temperature at 30° C. This material is commonly known as 55-Nitinol (50 atomic percent nickel equals 55 weight percent in Nitinol). Target 2 (T2) was a composition richer in titanium, approximately 50.25 atomic percent, with a transition temperature above 100° C.

Sputtering parameters such as target-substrate distance, power input, and Argon pressure were varied as follows: power input and Argon pressure were typically 250 to 400 Watts and 0.8 millitorr respectively and two target-substrate distances were used, 6.25 inches (outside glow discharge) and 2.25 inches (within glow discharge). The substrate was always at chamber temperature, meaning that outside the glow discharge the film was deposited at slightly above room temperature. Inside the glow discharge, thermocouple measurements indicated substrate temperatures up to 150° C., primarily due to ion activity.

In all cases, the as-deposited film was bright silver in color and highly reflective. The film was visibly transparent up to 2,000 Angstroms. On glass, cooper, aluminum, and Kapton film that have been thoroughly cleaned in acetone and ethel alcohol, the Ni-Ti film adheres relatively well for thicknesses below micron. Above one micron, the films can be released with scotch tape indicating poor adhesion. Remedies to this problem included chemical etching of substrate and/or plasma etching with Argon prior to deposition.

II. COMPOSITION

Small changes in the material composition of Nitinol (on the order of tenths of a percent) will vary the transition temperature of the bulk material. It was therefore necessary that the composition of Nitinol thin films be precisely controlled. With required resolutions of 0.1 atomic percent (at %) of either constituent, this can pose a problem for any type of thin film deposition. Sputtering can however, produce nearly identical composition in both film and target.

Flame Atomic Absorption (FAA) data for target T1 corresponded very well with the expected composition defined by the known transition temperature. In addition, the film composition was very nearly equal to that of the source material. For target T2, however, the result indicated that the film was slightly higher in nickel than the bulk material. It was concluded that this resulted from one or more of the following: (1) excessive titration and dilution of the dissolved material required before analysis; (2) insufficient development of the altered layer after two hours of presputtering; and/or (3) reactive sputtering with residual atmospheric gases other than Argon.

X-ray composition analysis of the T2 film composition was also performed as a check on the FAA results. Although inherently less accurate, the X-ray results were very similar to those of the FAA yet provide data which is believed to be more correct. The fact that both tests show a slight deficiency in titanium supports the theory of continued preferential sputtering or reactive contamination.

III. CRYSTAL STRUCTURE

X-ray Diffraction was used primarily to determine the crystal structure in each of the samples deposited. Detailed analysis on several specific examples was performed using Transmission Electron Micrographs and diffraction patterns. In all cases where deposition took palce on an unheated substrate, it was necessary to anneal the films to produce the crystal structure representative of the shape-memory alloy.

A. X-ray Diffraction Studies

For both target materials examined, the films in the as-deposited condition were relatively amorphous, also referred to as micro-crystalline or semi-amorphous. X-ray diffraction confirmed that the as-deposited films did not show any appreciable crystal structure.

Several possibilities for obtaining a crystal structure during deposition were examined. These included varying the substrate-target distance, sputtering power and Argon pressure. As predicted, decreasing substrate-target distance and increasing sputtering power both lead to faster deposition rates and higher substrate temperatures (up to 150° C.). Film deposited near the substrate appear to exhibit the same micro-crystalline state as those deposited at a greater distance. Increasing the Argon sputtering pressure caused an increase in ambient temperature but decreased deposition rate as more scattering took place. Here too, no affect in the films structure was observed. Two other methods also exist for depositing the film with a crystal structure: heating the substrate and/or depositing onto a similarly crystallized substrate.

It was therefore concluded that a separate annealing process was necessary to crystallize the film samples. The standard heat treatment to insure the shape-memory affect in bulk Nitinol is 520° C. for 15 minutes. Differential Scanning Calorimetry (DSC), verified that Ni-Ti film will crystallize consistently between 480° C. and 520° C. Because these films completely oxidize at this temperature in air, it was necessary to use a vacuum ampule annealing process, or dynamic vacuum (vacuum furance). The deposited films were placed in quartz or pyrex ampules with titanium sponge as an oxygen getter. After pumping to a medium or high vacuum, the ampule was sealed and placed in a furnace. For the present examples, the selected anneal for the Ni-Ti films was 520° C. for 30 minutes. Several different exposure temperatures and cool down rates were examined.

FIG. 4 through 8 represent the X-ray Diffraction curves for several samples of the Ni-Ti film, including one from each target material from which the films were made.

The curve in FIG. 4 illustrates the crystal structure of the T1 target material. The peaks at 42, 62, and 78° 2-theta are representative of the B2-CsCl ordered structure typical of austenitic Ni-Ti. The transition temperature of this material is known to be about 30° C. Since the X-rays slightly heat the sample during below analysis, it is expected that the material will show the austenite phase.

FIG. 5 illustrates the diffraction curve of an as-deposited film from T1. The broad, low intensity peak at 42° 2-theta indicates a semi-amorphous or micro-crystalline structure. This structure shows no characteristics of a crystallized material and, after physical examination, no shape-memory effect.

FIG. 6 illustrates that the annealed T1 film has nearly the same diffraction pattern as the source material, but the peaks are slightly shifted. The tall peaks represent the disordered BCC matrix whereas the shoulders to right of these peaks represent a smaller quantity of the ordered BCC, or CsCl, superlattice matrix characteristic of bulk material (FIG. 4). TEM studies of this film, indicated that this ordered crystal structure exists as precipitates within the grains of the disordered matrix.

The sample presented in FIG. 6 was exposed to 520° C. for 30 minutes and cooled in a furnace, with virtually no quench. The film was approximately 3 microns thick. As set forth below, DSC results indicate that this film has a transition temperature below 0° C., which means the film will definitely be in its high temperature phase at room temperature.

FIG. 7 illustrates the more complicated structure of the target 2 material. This material is known to have a transition temperature near 100° C. This curve indicates the existence of the martensitic (or B19) structure with some austenitic influence. Since the sample temperature is only slightly above room temperature during analysis, a martensitic structure is expected in its material.

The as-deposited film from target 2, presented in FIG. 8, is amorphous and very similar to that shown in FIG. 5. Again the width and the relatively low intensity peak indicate the lack of a defined crystal structure.

The curve in FIG. 9 represents 520° C. annealed film with an air cool. As in the annealed T1 film, the large peaks correspond to disordered BCC structure and show the shoulders of the ordered CsCl structure beginning to take place. Both ordered and disordered crystals are noted within this film. Also, the fact that the annealed film possesses a lower transition temperature than its parent material means that the material's property changed through the deposition process. As previously mentioned, this could be due to non-uniform sputtering affects or film contamination.

The crystalograpy of the Ni-Ti film was examined under several different annealing conditions. Using target 2 films, heat treatment at 450° C. in vacuum was completed and analyzed with X-ray diffraction. The curve illustrated in FIG. 10, representing 450° C. annealed, is almost identical to the as-deposited film presented in FIG. 8. This indicated that exposure temperatures much below 500° C. do not initiate crystalization and that the material will remain mostly amorphous. Physical examination of the film after this anneal does show that residual stresses from the deposition process, which cause a natural curling in the stand-alone film, are relieved at a temperature of 450° C.

The result of the x-ray diffraction analysis verified the necessity for a separate annealing process. The heat treatment sequences examined indicate that the films are not highly sensitive to exposure temperature, but are best kept close to the crystallization temperature of 500° C. with a rapid cool-down.

B. Transmission Electron Microscope (TEM)

To inspect the grain size in the Nitinol films, TEM was used. Two film specimens were chosen for the study: T1 and T2 film each annealed at 520° C. with air cool. The samples were prepared with ion milling.

FIGS. 11a and 11b represent the bright field and diffraction pattern respectively of the T1 film. The grain sizes are 1 to 2 microns across and fairly uniform. Within the grains there is evidence of precipitates that represent the development of an ordered CsCl BCC superlattice. The diffraction rings are typical of the ordered CcCl structure and support the X-ray diffraction results.

FIGS. 12a and 12b correspond to the T2 film annealed at 520° C. The average grain size is approximately 3 microns across. Slight differences in size and precipitate growth with the previous sample are noted which could be due to unequal control of the annealing sequences, degree of vacuum attained within each ampule, or material properties characteristic of the two different compositions.

Comparison of FIGS. 11a and 12a show that the precipitate density in the T1 annealed film is higher than that in the T2 film. This result is consistent with the X-ray diffraction curves, FIGS. 6 and 9, which illustrate that the shoulder peaks represent the ordered B2-CsCl structure are higher in the T1 annealed film than in the T2 film.

Both the X-ray diffraction and TEM analysis established that the as-deposited film was amorphous and, after annealing, developed into a metastable disordered BCC structure with B2-CsCl ordered precipitates. This is an interesting result since the annealed film strongly demonstrates shape-memory recovery even though it is mostly a disordered BCC structure in its high temperature phase. A higher temperature and/or longer anneal will affect the growth of these precipitate and the quality of the shape-memory affect.

IV. PHASE TRANSFORMATIONS

A highly informative measure of phase transformation in the shape-memory alloy is Differential Scanning Calorimetry (DSC). DSC was used to identify and evaluate the martensite-austenite transition in the Ni-Ti films. This technique very accurately measures temperature change in a specimen as a function of heat flow into or out of the sample. Bulk Nitinol exhibits an endothermic change on heating when transforming from martensite to austenite. On cooling, the reverse transformation is exothermic, Historically, the latent heat capacity is about 25 Joules per gram.

Each sample was weighed and securely mounted in the DSC apparatus. To minimize any oxidation affects, the heat stream was introduced using Argon at 100 cubic centimeters per minute. The samples are heated at a rate of 10° C. per minute.

FIGS. 13a and 13b show the well-defined endotherm and exotherm representative of the bulk target material. In both cases the heat capacity change was 26 J/gm as anticipated. The hysteresis between transition temperatures was larger than expected (80° C.), and believed to be partially due to thermal lag inherent in DSC measurements. Ideally, the annealed film should possess identical transition temperatures to those of the bulk material.

The thermograms for the annealed T2 film are illustrated in FIGS. 14a and 14b. This film was heat treated in vacuum at 520° C. with an air cool. Both the heating and cooling curves demonstrate double endotherms and exotherms respectively. On heating, the transition peaks at 23° C. with a secondary peak at 34° C. The total energy absorption was 20.7 J/gm, 5 J/gm which occurred in the second endotherm. This compares well with the expected latent heat of 26 J/gm. On cooling the first exotherm peaks at 29° C. and gives up 5 J/gm in energy. Since this is only 5° C. below a corresponding endotherm and the heat capacity changes are nearly equal, it is concluded that this represents the existence of R-phase Nitinol or is an effect of the disordered BCC structure. R-phase is a low hysteresis, low stress shape-memory affect that can be produced in Nitinol. The second exotherm at −37° C. shown in the cooling curve may correspond to the first endotherm on the heating curve. Although the heat value is lower in the former, the hysteresis is 60° C. which is close to that of the bulk material.

Physical examination of this film indicated that the actual shape change occurs in conjunction with the martensite-austenite transitions represented in the DSC, not the supposed R-phase or disordered transformation.

FIG. 15a illustrates the crystallization of a Ni-Ti film sample. This film was placed in the DSC in the as-deposited condition. Upon heating, no endotherms were present indicative of the shape-memory transformation. At 471° C., however, a sharp exothermic peak began which represented crystallization within the sample. After holding for 7 minutes at 550° C., the sample is then control cooled, shown in FIG. 15b. Disregarding the noise at the high end of the thermogram, the sample did show the characteristic exotherm on cooling at 16.5° C. To verify the newborn existence of the shape-memory affect, the sample was reheated.

FIGS. 16a and 16b represent the reheat and cooling of the previous sample. The double endotherms and exotherms, nearly the same as the annealed samples shown in FIGS. 14a and 14b, indicate that a crystallization and subsequent gain of the shape-memory property does occur after exposure to 500° C. Slight differences in spacing between these endotherms and exotherms and those of the annealed sample were noted which could be due to the differences in the annealing sequences.

V. SHAPE-MEMORY EFFECT

A. Stress/Strain Relations

To asses the quality of the shape-memory effect in sputtered films, a stress/strain testing apparatus specifically modified for thin films was used. The device consisted of two small clamps designed to hold specimens without initiating failure, a load cell to measure tensile force, a LVDT to monitor displacement, a constant current source for electrical heating, and a computer data acquisition system. The film samples were prepared by sputtering 5 to 11 micron of Ni-Ti onto glass slides coated with a water soluable release layer, $CaCl_2$. After deposition, the films were floated free in water and tested either as-deposited or in the annealed condition.

FIG. 17 illustrates the stress/strain relationship for as-deposited T2 film tested at room temperature. The curve shows the elastic nature of the film with no evidence of plastic deformation. FIG. 18 illustrates a similar relationship for the same film at a temperature of −54° C. The curves presented in FIGS. 17 and 18 thus confirm that the as-deposited material has no shape-memory property.

The annealed T2 film stress/strain curve at room temperature is shown in FIG. 19. Again, the film exhibits a very elastic response. According to the DSC measurements, annealed T2 film should be fully martensitic at or below −50° C. FIG. 20 illustrates the stress curve for the sample at −54° C., which does display a plastic deformation characteristic of martensite Nitinol. After releasing tension on the sample, and allowing it to return to room temperature, the strain was fully recovered and the film returned to its original length. The results not only confirm the existence of a shape-memory affect, but points out opportune similarity with the bulk material characteristics.

Using this same apparatus, it was possible to anneal the film with electrical heating. Using current density approaching 60 amps/$mm^2$ for 100 millisecond, the austenite BCC structure could be produced as was confirmed by X-ray Diffraction results. This annealing technique could prove beneficial for certain applications of the shape-memory film.

B. Shape Memory Observation

Samples of annealed T2 film prepared in thicknesses of 5 and 11 micron were tested for a physical shape-memory response to deformation by bending. The testing involved bending film in its high temperature phase, thus introducing larger bending stresses, and chilling it with Freon to its martensite state which relieves the internal stresses through plastic deformation. Upon warming back to the parent state, the film returns to its original position. Measurements of film stress in an 11 micron thick actuator sample, configured to lift 0.4 grams, indicated repeatable stresses of up to 483 MPa. This is on the order of bulk material, which is quite promising considering that the annealed film is not completely in the ordered BCC superlattice matrix.

SUMMARY

From the foregoing description, one of ordinary skill in the art can easily ascertain that the present invention provides a novel method for producing thin films of shape-memory alloy exhibiting characteristics of mechanical shape-memory. The disclosed micro-actuator devices, employing the thin films of shape-memory alloy make it possible for the first time to produce a shape-memory micro-actuator device, providing substantial forces, less than 10 microns thick.

Without departing from the spirit and scope of this invention, one of ordinary skill can make various changes and modifications to the invention to adapt it to various usages and conditions. As such these changes and modifications are properly, equitably, and intended to be, within the full range of equivalence of the following claims.

WHAT IS CLAIMED IS:

1. A mechanical device comprising:
   a support element;
   a movable element displaceable with respect to said support element between a first position and a second position;
   and a temperature-sensitive actuating element linking said support element to said movable element and displaceable between a first position wherein said movable element is in said first position thereof and a second position wherein said movable element is in said second position thereof;

said actuating element comprising a film of a shape-memory alloy having a phase transformation temperature range below which said alloy exhibits a martensitic crystal structure and is in a ductile condition and above which said alloy exhibits a parent austenitic crystal structure and approximates its undistorted shape;

and means for positioning said actuating element in said first position when said alloy is in a ductile condition;

said actuating element being responsive to a shift in its temperature from below to above said phase transformation temperature range to alter its condition to a parent austenitic condition and thereby move from said first position to said second position.

2. The mechanical device of claim 1 wherein said actuating element is less than 50 microns thick.

3. The mechanical device of claim 1 wherein said alloy comprises an ordered, partially disordered or fully disordered austenitic BCC crystal structure when heated above said phase transformation temperature range and exhibiting characteristics of mechanical shape-memory.

4. A two-state mechanical device comprising:
   support means;
   a movable element displaceable with respect to said support means between a first position and a second position;
   a pair of temperature-sensitive actuating elements linking said support means to said movable element and displaceable between a first position wherein said movable element is in said first position thereof and a second position wherein said movable element is in second position thereof;
   said temperature-sensitive actuating elements each comprising a film of shape-memory alloy which comprises an austenitic crystal structure above a phase transformation temperature range and exhibits characteristics of mechanical shape-memory due to thermoelastic, martensitic phase transformation in response to a shift in temperature from below to above said phase transformation temperature range to alter its condition and thereby move between said first and second positions;
   said temperature-sensitive actuating elements being arranged such that when one of said actuating elements is in a parent austenitic condition and the other of said actuating elements is in ductile condition, said actuating elements assume said first position, and arranged such that reversing said conditions said actuating elements will assume said second position displaced from said first position;
   control means for selectively heating said actuating elements to control the amount of shape change thereby controlling the position of said movable elements.

5. The mechanical device of claim 4 wherein said actuating elements are both in a ductile condition in a third position of said movable element.

6. The mechanical device of claim 4 wherein said alloy comprises an ordered, partially disordered or fully disordered austenitic BCC crystal structure when heated above said phase transformation temperature range and exhibiting characteristics of mechanical shape-memory.

7. A mechanical device having an actuating element linked to other elements for relative movement thereof, said actuating element being comprised of a shape-memory alloy responsive to temperature change to produce said relative movement, wherein said actuating element comprises a film of a shape-memory alloy having a phase transformation temperature range above which said alloy exhibits an austenitic crystal structure.

8. A method for producing a thin film exhibiting characteristics of mechanical shape-memory comprising:
   depositing a film of shape-memory alloy onto a substrate by means of a vacuum deposition process such that said alloy, either after annealing in a vacuum or in the presence of an inert atmosphere at a selected temperature, time and cool down rate, or after deposition on a heated substrate and cooling at a selected time and cool down rate,
   exhibits an ordered, partially disordered or fully disordered austenitic BCC crystal structure, said alloy undergoing thermoelastic, martensitic phase transformation in response to alterations in temperature to pass from a martensitic phase when at a temperature below a phase transformation temperature range and capable of a high level of recoverable strain to a parent austenitic phase and a memory shape when at a temperature above the phase transformation range.

9. A method for producing a two-state mechanical device comprising:
   etching side one of a substrate whereby windows covered by thin substrate membranes are created in the substrate;
   depositing at least two film actuator elements of shape-memory alloy onto side two of said substrate by means of a vacuum deposition process such that said alloy exhibits an amorphous crystalline structure;
   applying a force through a medium such as inert gas pressure to said substrate such that said substrate and said alloy films are deformed to a predetermined shape;
   annealing said alloy films in a vacuum or in the presence of an inert atmosphere at a selected temperature, time and cool down rate to produce an ordered, partially disordered or fully disordered austenitic BCC crystal structure when heated above a phase transformation temperature range and exhibiting characteristics of mechanical shape-memory;
   relieving said pressure such that said substrate membrane imposes a strain on said alloy films resulting in plastic deformation of one or both of said films at a temperature below said phase transformation temperature range; and
   etching the periphery of said thin substrate membranes of said substrate such that an island of substrate membrane is operably connected to said original substrate by said alloy films.

* * * * *

UNITED STATES PATENT AND TRADEMARK OFFICE
CERTIFICATE OF CORRECTION

PATENT NO. : 5,061,914

DATED : October 29, 1991

INVENTOR(S) : John D. Busch, et al.

It is certified that error appears in the above-identified patent and that said Letters Patent is hereby corrected as shown below:

Title Page:
In the Abstract, line 7, delete "Nickel" and insert —nickel—.

In the Abstract, line 18, delete "and" and insert —(and—.

In the Abstract, line 19, delete "strain" and insert —strain)—.

In Column 1, line 53, delete "micro meters" and insert —micrometers—.

In Column 1, line 58, delete "actuator" and insert —actuators—.

In Column 2, line 8, delete "weights" and insert —weighs—.

In Column 2, line 8, delete "$10^{-6cm}{}_3$" and insert —$10^{-6}cm^3$)—.

In Column 2, lines 26-27, delete "cystallography" and insert therefor —crystallography—.

In Column 2, lines 54 and 55, delete "cooper" and insert —copper—.

In Column 2, line 58, delete "cooper" and insert —copper—.

In Column 3, line 41, delete "Nickel Titanium" and insert —nickel titanium—.

In Column 3, line 49, before "thermoelastic" insert —a—.

In Column 3, line 52, delete "and" and insert —(and—.

In Column 3, line 53, delete "strain" and insert —strain)—.

In Column 3, line 61, delete "depsition" and insert —deposition—.

In Column 5, line 28, delete "above" and insert —below—.

In Column 5, line 29, delete "below" and insert —above—.

UNITED STATES PATENT AND TRADEMARK OFFICE
CERTIFICATE OF CORRECTION

PATENT NO. : 5,061,914

DATED : October 29, 1991

INVENTOR(S) : John D. Busch, et al.

It is certified that error appears in the above-identified patent and that said Letters Patent is hereby corrected as shown below:

In Column 6, line 24, delete "then" and insert —than—.

In Column 6, line 45, delete "!2" and insert therefor —12—.

In Column 6, line 51, before "end" insert —one—.

In Column 6, line 63, after "undergoes" insert —a—.

In Column 6, line 67, delete "and" and insert —(and—.

In Column 6, line 68, delete "(<6&)" and insert —(<6%))—.

In Column 7, line 40, delete "cooper" and insert —copper—.

In Column 7, line 43, after "below" insert —1—.

In Column 7, line 57, delete "can" and insert —can,—.

In Column 8, line 19, delete "palce" and insert —place—.

In Column 8, line 36, delete "Film" and insert —Films—.

In Column 8, line 41, delete "films" and insert —film's—.

In Column 8, line 55, delete "furance" and insert —furnace—.

In Column 9, line 3, delete "below".

In Column 9, line 34, delete "a martensitic structure is expected in its material" and insert —it is expected that this material will show the martensitic phase—.

In Column 9, line 50, delete "crystalography" and insert —crystallography—.

In Column 10, line 13, delete "CcCl" and insert —CsCl—.

UNITED STATES PATENT AND TRADEMARK OFFICE
CERTIFICATE OF CORRECTION

PATENT NO. : 5,061,914

DATED : October 29, 1991

INVENTOR(S) : John D. Busch, et al.

It is certified that error appears in the above-identified patent and that said Letters Patent is hereby corrected as shown below:

In Column 11, line 35, delete "affect" and insert —effect—.

In Column 11, line 50, delete "asses" and insert —assess—.

In Column 11, line 55, delete the first occurrence of "a" and insert —an—.

In Column 11, line 58, delete "micron" and insert —microns—.

In Column 12, line 14, delete "opportune".

In Column 12, line 17, after "Using" insert —a—.

In Column 12, line 18, delete "millisecond" and insert —milliseconds—.

In Column 12, line 20, delete "Diffraction" and insert —diffraction—.

In Column 12, line 26, delete "micron" and insert —microns—.

In Column 12, line 30, delete "Freon" and insert —freon—.

Signed and Sealed this

Fourth Day of May, 1993

*Attest:*

MICHAEL K. KIRK

*Attesting Officer*     *Acting Commissioner of Patents and Trademarks*